United States Patent [19]
Rolfe et al.

[11] Patent Number: 6,052,216
[45] Date of Patent: Apr. 18, 2000

[54] LASER AND BEAM INTENSITY MODULATION SYSTEM FOR IMAGESETTING DEVICE

[75] Inventors: Norman F. Rolfe, Carlisle; Steven E. Mason, North Andover; Jeffrey Knox, Lynnfield; Arkady B. Chernin, Marblehead, all of Mass.

[73] Assignee: Agfa Corporation, Wilmington, Mass.

[21] Appl. No.: 09/240,983

[22] Filed: Jan. 29, 1999

[51] Int. Cl.[7] .................. G02F 1/11; G02F 1/33; G02B 26/00
[52] U.S. Cl. .................. 359/285; 359/307; 359/305; 359/310; 359/239; 359/287; 348/769
[58] Field of Search .................. 359/307, 305, 359/310, 239, 287, 285; 348/769

[56] References Cited

U.S. PATENT DOCUMENTS

| | | | |
|---|---|---|---|
| 4,381,887 | 5/1983 | Guerin et al. | 350/358 |
| 4,443,066 | 4/1984 | Freyre | 350/358 |
| 4,447,134 | 5/1984 | Rosenheck | 350/358 |
| 4,473,275 | 9/1984 | David, Jr. et al. | 350/358 |
| 4,733,252 | 3/1988 | Daniele et al. | 346/108 |
| 4,776,654 | 10/1988 | Ishizuka et al. | 350/6.8 |
| 5,105,304 | 4/1992 | Tanaka et al. | 359/287 |
| 5,623,360 | 4/1997 | Gesell et al. | 359/287 |

*Primary Examiner*—Georgia Epps
*Assistant Examiner*—Adrianne Riviere
*Attorney, Agent, or Firm*—Robert A. Sabourin

[57] ABSTRACT

A laser beam intensity modulation system has a variable delay circuit that is used to control the relative delay in the delivery of a video signal between two cascaded AOM's. This delay circuit is controlled by a delay controller that monitors the intensity modulation of the laser beam to provide feedback control. This system maximizes the rise and fall times of the beam to generate precise beam modulation required for high speed image setters.

26 Claims, 4 Drawing Sheets

1ST AOM RF GRATING
LEVEL AT OPTICAL BEAM

2ND AOM RF GRATING
LEVEL AT OPTICAL BEAM

WAVEFORM OF 1ST ORDER
BEAM OF 2ND AOM

TIME

AVERAGE OF WAVEFORM
OF 1ST ORDER BEAM OF
2ND AOM VS $t_1$

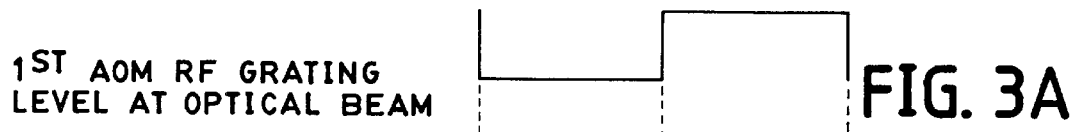
FIG. 3A 1ST AOM RF GRATING LEVEL AT OPTICAL BEAM
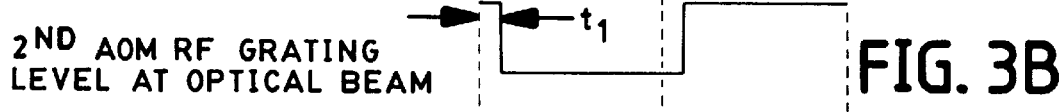
FIG. 3B 2ND AOM RF GRATING LEVEL AT OPTICAL BEAM
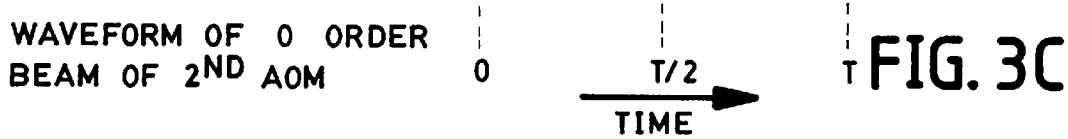
FIG. 3C WAVEFORM OF 0 ORDER BEAM OF 2ND AOM
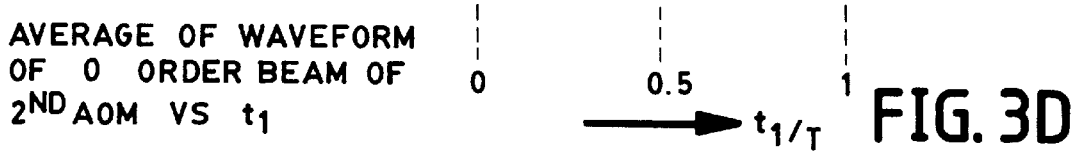
FIG. 3D AVERAGE OF WAVEFORM OF 0 ORDER BEAM OF 2ND AOM VS $t_1$

LASER AND BEAM INTENSITY MODULATION SYSTEM FOR IMAGESETTING DEVICE

BACKGROUND OF THE INVENTION

Image setters are pre-press devices that are used to expose a photosensitive medium based on an image to be printed. Generally, in the past, most image setters have had an internal-drum configuration, in which the photosensitive medium is laid on the inner surface of a cylindrical drum. A laser beam, typically originating from the drum's axis, is then raster scanned across the photosensitive media to selectively expose it to form the image. External drum image setters, however, are becoming increasingly common.

Although digital photosensitive media, for example, are optically sensitive, the laser beam power from the scanning laser is relatively high in image setters deployed in industrial environments. This characteristic is due to the fact that media throughput is one of the main factors in determining the productivity, and thus value, of an image setter. Consequently, the speed at which the beam is scanned across the photosensitive media is typically maximized. As a result, since the time the laser beam is exposing any given region of the photosensitive media is reduced, the beam's power must be increased to deposit enough energy in the media to initiate the necessary chemical reactions for exposure.

In order to achieve the necessary beam power, many times solid-state lasers, such as Nd:YAG lasers, are used. These lasers can not be switched on and off at the necessary speed required to form the image. Consequently, the lasers are typically run in a CW mode, and a separate laser beam intensity modulation system is used.

Commonly, at the core of the laser beam intensity modulation systems are devices called acousto-optic modulators (AOM's). These are beam steering devices, which, in an unactivated state transmit the beam directly through the crystal substrate, referred to as the zero-order beam or light, and when activated by a radio-frequency source, refract the beam at known angle, referred to as the first-order beam or light.

AOM's are relatively efficient devices. When unactivated, they transmit most of the light input to the crystal through as the zero-order light, except for some incidental scattering. When activated, most of the beam, approximately 80% or more, is diverted or steered to emerge as a first-order beam, while 20% is still transmitted through the crystal as zero-order light.

In most image setters using AOM's in the laser beam intensity modulation system, the first-order light from the AOM is used to expose the photosensitive media. In other words, when a given region of the photosensitive media is to be exposed, the AOM is activated to steer the laser beam into an optical path that leads to the photosensitive media. In an unactivated state, the zero-order light passing through the AOM does not reach the photosensitive media, being dumped outside the optical path.

The use of the first-order light to expose the photosensitive medium works well as a strategy for meeting the exposure requirements of common digital media. The first order beam provides a very high dynamic range between the light levels of the first-order beam and the relatively insignificant scattering that is transmitted along the optical path when the AOM is unactivated. As a result, there is little clouding of the medium due to incidental exposure of those areas of the photosensitive medium that are intended to not be exposed based upon the image.

SUMMARY OF THE INVENTION

The problem with the conventional use of first-order light to expose the photosensitive media is the fact that even under the best operating conditions, less than 80% of the light generated by the laser is transmitted through to the media. This is due to the fact that even the most efficient AOM's can not convert all the input beam power into the first-order light. As a result, in one sense, a higher power laser is required than strictly necessary. In many situations, this characteristic is unfortunate since the lasers are substantial parts of the total cost of image setters and many times an incremental increase in the laser's power can result in substantially increased expense for the laser component.

Solutions have been proposed to improving the dynamic range of generic laser beam intensity modulation systems relying on zero-order light. These techniques have relied on cascading AOM's in the optical path. In an unmodulated state, both AOM's transmit the beam through as zero-order light. Then, to cut off the beam, both AOM's are activated in tandem. The first AOM decreases the zero-order beam by 80% and the second AOM decreases the remaining 20% of the laser beam by another 80%. A dual system, therefore, can generate 95% beam attenuation, in theory.

The problem with presently proposed systems, however, is the manner in which the modulating signal is adjusted or sent between the two AOM's. A delay line is used to delay the signal to the second AOM to match the delays. Due to the precision to which the beam must be modulated in high speed image setters, such a set-and-forget system is not accurate enough.

The present invention is directed to a laser beam intensity modulation system. A variable delay circuit is used to control the relative delay in the delivery of a video signal between two cascaded AOM's. This delay circuit is controlled by a delay controller that monitors the intensity modulation, or more specifically, average intensity, of the laser beam at a second or subsequent AOM output to provide feedback control.

In general, according to one aspect, the invention concerns an exposure system for an image setting device. The system comprises a laser and a scanner for scanning the beam from the laser across a photosensitive media. A laser beam intensity modulation system is used to intensity modulate that laser beam. The system comprises a video signal source that dictates the exposure of the photosensitive media. At least two AOM's intensity-modulate the laser beam in response to the video source. A variable delay is used to control the relative delay in the delivery of the video signal between the AOM's. A delay controller controls this variable delay in response to the intensity modulation of the laser beam by the AOM's, thus providing feedback control.

In specific embodiments, the image setting device is an internal drum image setter. In such configurations, the scanning system typically comprises a spin mirror for raster scanning the beam across the photosensitive media. In order to maximize the intensity of the laser beam that is projected onto the photosensitive media the AOM's are aligned in the optical path from the laser to the photosensitive media to transmit zero-order light to expose the photosensitive media. Higher-order light is steered out of this optical path. In the preferred embodiment, an optical detector is used to detect the modulated beam from the AOM's. This can be most easily achieved by positioning the optical detector to detect the first-order beam from the last AOM in the cascade. In this way, the delay circuit can be controlled to minimize the average intensity of the modulated laser beam when the video signal is in a square wave mode.

Moreover, to further improve the rise time and fall time, a focusing system is used between the two AOM's. This assures that any degradation in the rise time and/or fall time due to propagation delays of a radio frequency signal across the crystal substrate of the AOM's is minimized.

In general, according to another aspect, the invention concerns a beam modulation system. This system comprises a signal source that provides a modulating signal and at least two AOM's that intensity-modulate the beam. A variable delay circuit is used to control the relative delay in delivery of the modulating signal to the AOM's. A delay controller then controls this variable delay.

Finally, according to still another aspect, the invention features an exposure method for an image setting device. This method comprises generating a laser beam and intensity modulating the laser beam in response to a video signal using at least two AOM's. The modulated laser beam is then scanned across a photosensitive media. A relative delay between the times at which the video signal is delivered to the AOM's is controlled in response to a detected modulation of the beam. In this way, feedback is provided to fine-tune the distribution of the video signal relative to the delays associated with the propagation of the acoustical waves in the AOM's.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings:

FIG. 3A is a plot of the RF (radio-frequency) grating level at the optical beam in the first AOM;

FIG. 3B is a plot of the RF grating level at the optical beam in the second AOM;

FIG. 3C is the waveform detected by the silicon cell detector, i.e., zero-order beam at the output of the second AOM;

FIG. 3D is a plot of the average of the zero-order beam of the second AOM as a function of $t_1/T$, i.e., as a function of the phase misalignment between the AOM modulation.

DETAILED DESCRIPTION OF THE INVENTION

Figure 1:
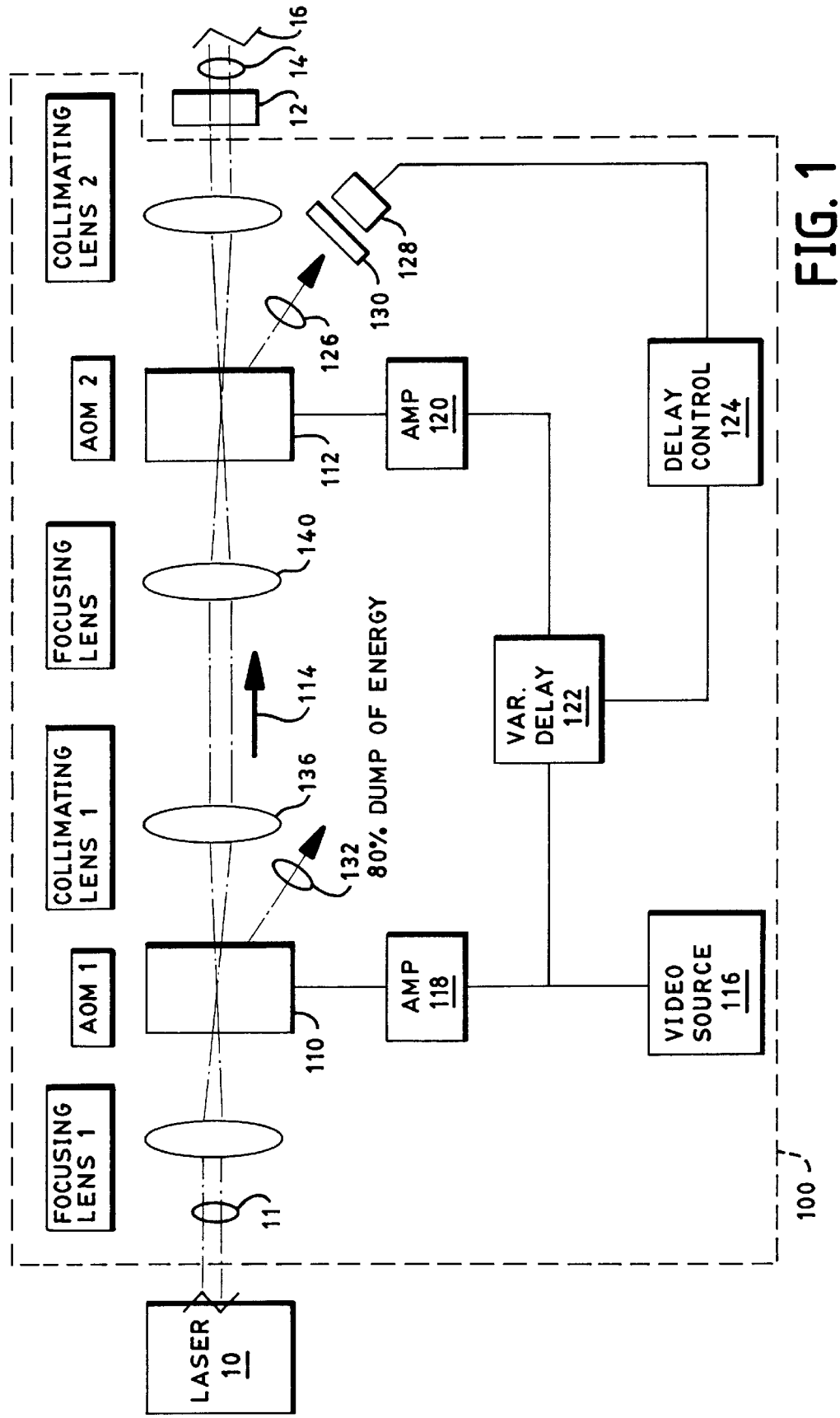
FIG. 1 is a block diagram illustrating a laser beam intensity modulation system according to the present invention.

FIG. 1 illustrates a laser beam intensity modulation system 100, which has been constructed according to the principles of the present invention. The current implementation is in an exposure system of an image setting device. The modulation system 100 is optically located between a laser 10, which generates a laser beam 11, and a scanning system 12 that raster scans the output beam 14 across a photosensitive media 16. In the preferred embodiment, the laser is a solid state laser such as a Nd:YAG laser. The input laser beam 11 is intensity modulated by system 100 before reaching the scanning system 12 as output beam 14.

The laser beam intensity modulation system 100 comprises at least two cascaded electro-optic modulators 110, 112, which are AOM's (acousto-optic modulators) in the preferred embodiment. These AOM's 110, 112 are arranged in the optical path 114 between the laser 10 and the photosensitive media 16 so that zero-order light, i.e., the light that is transmitted directly through AOM's 110,112 in their unactivated or unmodulated state is transmitted along the optical path 114. The first-order, or diffracted, light that is generated when AOM's 110,112 are activated by an RF (radio-frequency) signal is steered out of the optical path 114 so that it does not reach the photosensitive media 16.

AOM's 110, 112 are controlled or modulated in response to a video signal from video source 116. In the preferred embodiment, the video signal is supplied to an amplifier 118, which generates a radio-frequency signal in AOM 110. The acoustic signal traveling through the AOM forms a periodic grating, which diffracts the input beam. The same video signal is provided to a second amplifier 120 to activate the second AOM 112. In order to provide identical arrival times for the acoustic waves reaching the optical beams in the two AOM's 110, 112 (i.e., the difference in the transit times of the acoustic wave to traverse to the location of the focused beam of light with each AOM and any electrical delay discrepancies), a variable delay 122 is provided on the signal path from the video source to the second amplifier 120.

A delay controller 124 operates or controls the level of delay provided by the variable delay circuit 122. In the preferred embodiment, the delay controller detects the first-order light from the second AOM 112 using silicon cell detector 128, with an intervening optical density filter 130.

Figure 2A:
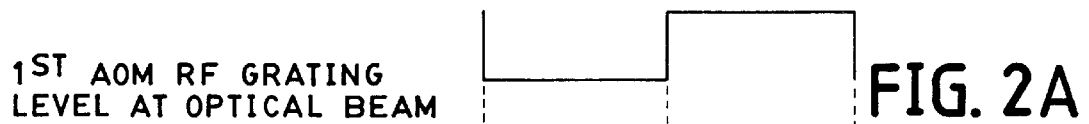
FIG. 2A is a plot of the RF (radio-frequency) grating level at the optical beam in the first AOM.
Figure 2B:
FIG. 2B is a plot of the RF grating level at the optical beam in the second AOM.

FIGS. 2A and 2B are plots of RF grating level, or level of modulation, in AOM's 110, 112 respectively, a function of a bit period at the respective optical beam locations in those AOM's. As illustrated, their operation is not perfectly synchronized. A timing error of $t_1$ is present, in which the second AOM 112 lags the first AOM 110.

Figure 2C:
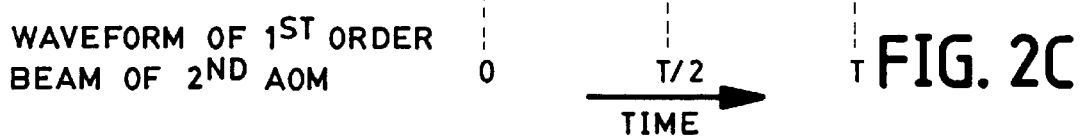
FIG. 2C is the waveform detected by the silicon cell detector, i.e., first-order beam at the output of the second AOM.

FIG. 2C shows the effect of this timing error in the first-order waveform from the second AOM 112. This effect is due to the fact that the second AOM is not modulating the optical beam precisely in synchronism with the first AOM. Such operation arises generally because the optical beams are not being focused at the same locations in the AOM's 110, 112.

The propagation speed for the light between the AOM's is inconsequential and generally, the modulating RF signal can be distributed to AOM's simultaneously. The problem of improper synchronization, however, arises because the acoustic wave traverses relatively slowly across the AOM. It can require as long as one microsecond to establish the diffraction grating at the point where the focused beam traverses the crystal substrate.

Even a few nanoseconds discrepancy in the moment the acoustic wave reaches the location of the laser beam in the acousto-optic modulators 110, 112 is noticeable in the devices operation. This is especially true at the higher frequencies at which the beams are modulated under current technology. Presently, devices are available that modulate the laser beam at 25–50 MegaHertz (MHz), but speeds approaching 100 MHz are in the design stage. Characterizing $t_1$ when it is on the order of a few nanoseconds is very difficult without expensive measurement equipment.

Factory calibration of the system minimizes the timing errors by ensuring gross alignment of the AOM's, but not all error can be removed. Further, new phase or timing errors arise during the operation of the machine, both across its lifetime and across a given operating cycle, such as a day. They are generally caused by thermal effects, which can move the optical components out of their original positions even when properly calibrated at the factory.

Figure 2D:
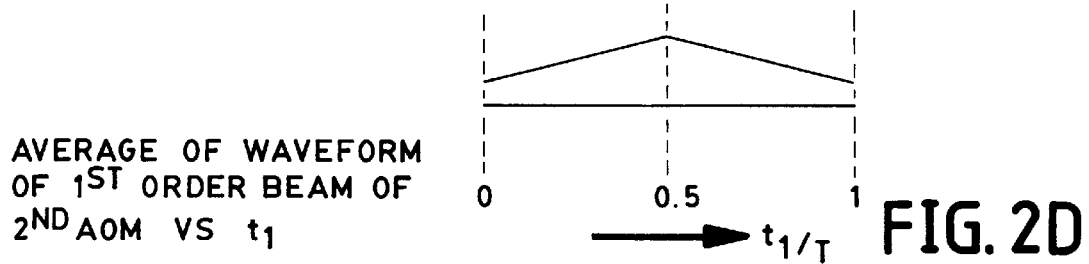
FIG. 2D is a plot of the average of the first order beam of the second AOM as a function of $t_1/T$, i.e., as a function of the phase misalignment between the AOM modulation.

As illustrated in FIG. 2D, according to the invention, the silicon photocell 128 and delay controller 124 measure the average of the first order beam at the second AOM 112. This average is indicative of the timing error between the operation of the two AOM's 110, 112. Specifically, as illustrated in FIG. 2D, the average varies as a function of the phase or timing error across the bit period. The delay controller 124 adjusts the variable delay 122 to minimize the average intensity of the waveform detected by the detector 128. This average is measured across 10's to 100's to 1000's of bit periods, depending on the implementation, by selecting the time constant of the silicon photocell, which inherently performs an integration operation on the detected signal. When this average is minimized, the timing error $t_1$ is minimized, or eliminated.

FIGS. 3A–3D show an analogous situation where the control is performed in response to the zero-order light from the second AOM. Specifically. FIGS. 3A and 3B illustrate another timing error in the synchronization of the first AOM 110 and second AOM 112. This leads to a suboptimal rise time and fall time in the zero-order beam from the second AOM 112, see FIG. 3C. Finally, as illustrated in FIG. 3D, the average of the zero-order beam from the second AOM 112 is descriptive of the timing error between the two AOM's 110, 112. Specifically, by maximizing the average of the waveform from the second AOM 112, the timing error $t_1$ is minimized, or eliminated.

Figure 4:
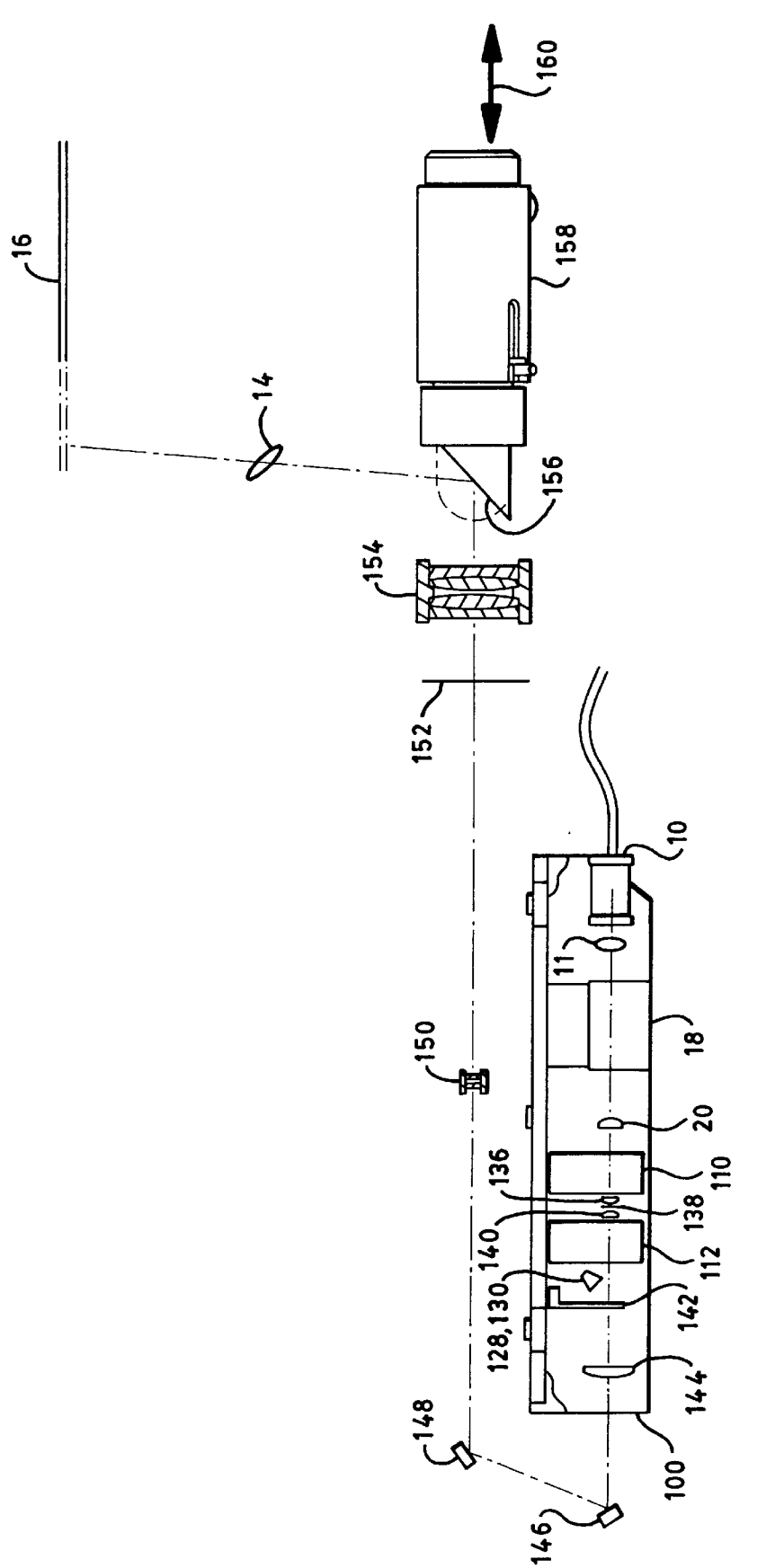
FIG. 4 is a detailed view of the laser beam intensity modulation system of the present invention, in its implementation in an image setter.

FIG. 4 shows the implementation of the laser beam intensity modulation system 100 in an image setter. Specifically, the laser beam 11 generated by laser 10 passes through a Faraday isolator 18 to an AOM focus lens 20. This lens ensures that the beam waist in AOM 110 is narrow to reduce any delay in the initiation of steering across the width of the beam to further minimize the rise and fall times. After leaving the first AOM 110, the zero-order beam passes through a collimating lens 136 and a mask 138 before passing through a second focusing lens 140. This focusing lens 140 ensures a small beam waist in the second AOM 112.

After leaving the second AOM 112, the beam passes through another mask 142 and then a collimating lens 144. Two successive fold mirrors 146 and 148 redirect the beam to diverging lens 150 and an aperture 152. A final focusing array of lenses 154 directs the beam to a spin mirror 156, which scans the beam 14 over the photosensitive media 16 held on the internal drum surface. The spin mirror is powered by a spin motor 158 to raster scan the beam while moving along the drum axis 160.

While this invention has been particularly shown and described with references to preferred embodiments thereof, it will be understood by those skilled in the art that various form changes in and details may be made therein without departing from the spirit and scope of the invention as defined by the appended claims. For example additional AOM's can be added to the cascade to obtain greater beam attenuation in the off-state. In one such embodiment, an additional variable delay and delay controller are used of each AOM to adjust its delay relative to the previous AOM's in the direction of light propagation.

What is claimed is:

1. An exposure system for an image setting device, comprising a laser for generating a laser beam;
    a scanning system for scanning the laser beam across a photo-sensitive media; and
    a laser beam intensity modulation system that comprises:
    a video signal source that provides a video signal dictating the exposure of the photosensitive media,
    at least two cascaded acousto-optic modulators that intensity modulate the laser beam in response to the video signal,
    a variable delay circuit that controls a relative delay in a delivery of the video signal to the acousto-optic modulators, and
    a delay controller that controls the variable delay circuit in response to the intensity modulation of the laser beam by the acousto-optic modulators.

2. An exposure system as described in claim 1, wherein the image setting device is an internal drum image setter.

3. An exposure system as described in claim 1, wherein the laser generates a cw laser beam.

4. An exposure system as described in claim 1, wherein the scanning system comprises a spin mirror for raster scanning the beam across the photosensitive media.

5. An exposure system as described in claim 1, wherein the acousto-optic modulators are aligned in an optical path from the laser to the scanning system to transmit zero-order light to expose the photosensitive media and steering higher-order light out of the optical path.

6. An exposure system as described in claim 1, further comprising an optical detector that detects a modulated beam from the acousto-optic modulators.

7. An exposure system as described in claim 6, wherein the optical detector is positioned to detect zero order, a first order, or higher order beam from one of the acousto-optic modulators other than the first acousto-optic modulator for the delay controller.

8. An exposure system as described in claim 6, wherein the optical detector is positioned to detect a modulated beam from a second one of the acousto-optic modulators for the delay controller.

9. An exposure system as described in claim 6, wherein the delay controller modulates the variable delay circuit in response to an average response of the optical detector.

10. An exposure system as described in claim 1, further comprising beam focusing system in the optical path between the acousto-optic modulators.

11. An exposure system as described in claim 9, wherein the beam focusing system comprises a collimating lens and a focusing lens.

12. A beam modulation system, comprising
    a signal source that provides a modulating signal;
    at least two cascaded zero-order acousto-optic modulators that intensity modulate a beam in response to modulating signal;
    a variable delay circuit controlling a relative delay in a delivery of the modulating signal to the acousto-optic modulators; and a delay controller that controls the variable delay circuit.

13. A modulation system as described in claim 12, further comprising an optical detector that detects a modulated beam from the acousto-optic modulators.

14. A beam modulation system as described in claim 13, wherein the delay controller modulates the variable delay circuit in response to an average response of the optical detector.

15. A beam modulation system as described in claim 13, wherein the optical detector is positioned to detect a zero order, first order, or higher order beam from one of the acousto-optic modulators other than the first acousto-optic modulator for the delay controller.

16. A beam modulation system as described in claim 13, wherein the optical detector is positioned to detect a zero order or first order beam from a second one of acousto-optic modulators for the delay controller.

17. A beam modulation system as described in claim 12, further comprising beam focusing system in the optical path between the acousto-optic modulators.

18. A beam modulation system as described in claim 17, wherein the beam focusing system comprises a collimating lens and a focusing lens.

19. An exposure method for an image setting device, comprising generating a laser beam;

intensity modulating the laser beam in response to a video signal using at least two successive acousto-optic modulators;

scanning the modulated laser beam across a photosensitive media: and controlling a relative delay between in the times at which the video signal is delivered to the acousto-optic modulators in response to a detected modulation of the beam.

20. An exposure method as described in claim 19, wherein scanning the laser beam comprises directing the beam at a spinning fold mirror.

21. An exposure method as described in claim 19, further comprising aligning the acoustooptic modulators an optical path to transmit zero-order light to expose the photosensitive media and steering higher-order light out of the optical path.

22. An exposure method as described in claim 19, further comprising detecting a modulated beam from the acousto-optic modulators.

23. An exposure method as described in claim 19, further comprising detecting a zero order, first order, or higher order beam from one of the acousto-optic modulators other than the first acousto-optic modulator for controlling the relative delay.

24. An exposure method as described in claim 19, further comprising detecting a zero order or first order beam from a second one of acousto-optic modulators.

25. An exposure method as described in claim 19, further comprising focusing the laser beam between the acousto-optic modulators.

26. An exposure method as described in claim 19, further comprising detecting an average of a modulated beam from the acousto-optic modulators and controlling the relative delay in response to the average.

* * * * *